US012659623B2

(12) United States Patent
Bianchini et al.

(10) Patent No.: US 12,659,623 B2
(45) Date of Patent: Jun. 16, 2026

(54) AVALANCHE PHOTODIODE PIXEL

(71) Applicant: STMicroelectronics International N.V., Geneva (CH)

(72) Inventors: Raffaele Bianchini, Grenoble (FR); Raul Andres Bianchi, Myans (FR); Mohammed Al-Rawhani, Glasgow (GB)

(73) Assignee: STMicroelectronics International N.V., Geneva (CH)

( * ) Notice: Subject to any disclaimer, the term of this patent is extended or adjusted under 35 U.S.C. 154(b) by 130 days.

(21) Appl. No.: 18/613,987

(22) Filed: Mar. 22, 2024

(65) Prior Publication Data

US 2024/0334087 A1      Oct. 3, 2024

(30) Foreign Application Priority Data

Mar. 30, 2023    (FR) ...................................... 2303090

(51) Int. Cl.
| | |
|---|---|
| *H04N 25/773* | (2023.01) |
| *H04N 25/709* | (2023.01) |
| *H04N 25/779* | (2023.01) |

(52) U.S. Cl.
CPC ......... *H04N 25/773* (2023.01); *H04N 25/709* (2023.01); *H04N 25/779* (2023.01)

(58) Field of Classification Search
CPC .... H04N 25/77; H04N 25/772; H04N 25/773; H04N 25/779
See application file for complete search history.

(56) References Cited

U.S. PATENT DOCUMENTS

| | | | | |
|---|---|---|---|---|
| 2018/0058924 A1* | 3/2018 | Storm | ........................ | G01J 1/44 |
| 2020/0011732 A1* | 1/2020 | Dutton | .................... | H10F 77/95 |
| 2021/0181016 A1* | 6/2021 | Al-Rawhani | ............ | G01J 1/44 |
| 2021/0181017 A1* | 6/2021 | Al-Rawhani | ............ | G01J 1/44 |
| 2021/0193859 A1* | 6/2021 | Al-Rawhani | ........ | H04N 25/773 |
| 2023/0370741 A1* | 11/2023 | Tojima | .................. | H10F 77/959 |
| 2024/0151828 A1* | 5/2024 | Al-Rawhani | ........ | H04N 25/773 |

FOREIGN PATENT DOCUMENTS

IT          TO20130128 A1      8/2014

* cited by examiner

*Primary Examiner* — Daniel M Pasiewicz
(74) *Attorney, Agent, or Firm* — Seed Intellectual Property Law Group LLP

(57) ABSTRACT

The present disclosure relates to an avalanche photodiode pixel including: a transistor adapted to be controlled by an enable signal having a first state for controlling the enabling of the pixel and a second state for controlling the disabling of the pixel, the transistor being configured to couple an avalanche photodiode of the pixel to a node of application of a substrate voltage when the enable signal is in the first state; and an output circuit adapted to be controlled by the enable signal and configured to provide a pixel output signal when the enable signal is in the first state and to block the pixel output signal when the enable signal is in the second state.

23 Claims, 3 Drawing Sheets

AVALANCHE PHOTODIODE PIXEL

CROSS-REFERENCE TO RELATED APPLICATION(S)

This application claims the priority benefit of French patent application number 2303090, filed on Mar. 30, 2023, entitled "Pixel à photodiode à avalanche", which is hereby incorporated by reference to the maximum extent allowable by law.

BACKGROUND

Technical Field

The present disclosure relates generally to the field of APD (avalanche photodiode) pixel matrices, and in particular of SPAD (single-photon avalanche diode) pixel matrices.

Description of the Related Art

A SPAD, like an APD, exploits the photon-triggered avalanche current of a reverse biased p-n junction to detect an incident radiation. The fundamental difference between a SPAD and an APD is that a SPAD is specifically designed to operate with a reverse bias voltage above the breakdown voltage, while an APD operates at a bias lesser than the breakdown voltage. In a SPAD, a single photogenerated carrier can trigger an avalanche in the depleted zone by impact ionization effect. The SPAD is then in Geiger condition, or in Geiger mode. In a SPAD or an APD, each time a photon is absorbed by an active area of the photodiode, a rapid discharge is triggered. The discharges are counted using one (or a plurality of) counter(s).

Avalanche photodiodes are generally included in electronic devices. An electronic device may include several pixels each including at least one avalanche photodiode. For example, an image sensor may include a matrix of pixels, each including at least one avalanche photodiode which allows the image sensor to obtain an image of a scene at a given instant. The image generally consists of a matrix of pixels, each pixel including at least one avalanche photodiode.

Such a pixel matrix can be used for a variety of applications, including for example ranging, 2D or 3D imaging, depth mapping or light detection and ranging (LiDAR).

An electronic device for such applications may include a light source for transmitting a light pulse into the image scene. The light reflected back from any object in the image scene is detected by the photodiodes in the pixels, and used to determine the time of flight of the light pulse. The distance from the object to the electronic device can then be deduced based on this time of flight. The detection by the photodiodes of the reflected light pulse may be based on discharge counting. In particular, each photodiode may provide a discharge count when a photon is detected, and by monitoring the discharge counts, the arrival time of the reflected light pulse may be estimated.

Large avalanche photodiode matrices can include many more, for example about ten times or even a hundred times more, pixels than counters. The pixels of a matrix may be divided into different subsets (or sub areas) of pixels, each subset (or sub area) being be coupled to a common counter, for example through an OR Tree, and the pixels of the subset may be enabled alternatively to have one single active pixel linked to the same counter at one time, while the other ones of the subset have preferably to be disabled.

BRIEF SUMMARY

There is a need to securely be able to disable each pixel, for example to avoid compromising the counting in a subset (or sub area) of pixels by a counter which is common to all the pixels of the subset.

Embodiments of the present disclosure address all or some of the drawbacks of known avalanche photodiode pixels.

One embodiment provides an avalanche photodiode pixel including:

a transistor adapted to be controlled by an enable signal having a first state for controlling the enabling of the pixel and a second state for controlling the disabling of the pixel, the transistor being configured to couple an avalanche photodiode of the pixel to a node of application of a substrate voltage when the enable signal is in the first state; and an output circuit adapted to be controlled by the enable signal and configured to provide a pixel output signal when the enable signal is in the first state and to block the pixel output signal when the enable signal is in the second state.

In an embodiment, the enable signal is an enable voltage.

In an embodiment, the avalanche photodiode pixel further includes a detection circuit coupled to the avalanche photodiode and configured to generate the pixel output signal.

In an embodiment, the detection circuit includes an inverter, for example configured to convert an analogic signal generated by the avalanche photodiode into a digital signal to generate the pixel output signal.

In an embodiment, the output circuit includes an output AND gate including a first input node to which the pixel output signal is adapted to be applied, a second input node to which the enable signal is adapted to be applied, the output node of the output AND gate being coupled, or corresponding, to an output node of the pixel.

In an embodiment, the first input node of the output AND gate is coupled, for example connected, to an output node of the inverter.

In an embodiment, the inverter is adapted to be powered by a dedicated power supply voltage.

In an embodiment, the output circuit includes the inverter, the inverter being adapted to be controlled by the enable signal, for example the enable signal being applied to a node of application of a power supply voltage of the inverter.

In an embodiment, an output node of the inverter is coupled, or corresponds, to an output node of the pixel.

In an embodiment, the output circuit is coupled, for example connected, to a counter, for example the counter being configured to integrate the pixel output signal when the enable signal is in the first state.

In an embodiment, the avalanche photodiode pixel further includes another inverter between the inverter and the output node of the detection circuit.

In an embodiment, the avalanche photodiode further includes a buffer adapted to increase the power of the enable signal.

One embodiment provides a pixel matrix including a plurality of avalanche photodiode pixels as the avalanche photodiode pixels described above, wherein the avalanche photodiode pixels are organized into different sub areas of avalanche photodiode pixels, the avalanche photodiode pixels of the same sub area being coupled to a common counter.

In an embodiment, the pixel matrix further includes a selection circuit configured to selectively addressing the enable signal to one avalanche photodiode pixel of the avalanche photodiode pixels of a sub area, the selection circuit including an output node coupled at least to the transistor of the avalanche photodiode pixel.

In an embodiment, the output node of the selection circuit is also coupled or connected to the second input node of the output AND gate.

In an embodiment, the output node of the selection circuit is also coupled or connected to a node of application of a power supply of the inverter.

In an embodiment, the buffer is included in the selection circuit.

In an embodiment, a method includes applying a substrate voltage to an avalanche photodiode of a pixel by enabling, with a first state of an enable signal, a transistor of the pixel and disabling, with a second state of the enable signal, the transistor. The method includes controlling an output circuit of the pixel with the enable signal, providing, with the output circuit, a pixel output signal when the enable signal is in the first state, and blocking the pixel output signal when the enable signal is in the second state.

In an embodiment, a device includes a selection circuit configured to output an enable signal and a pixel coupled to the selection circuit. The pixel includes an avalanche photodiode, a transistor coupled between the avalanche photodiode and a substrate voltage and having a gate terminal configured to receive the enable signal, and an output circuit having a first input coupled to the avalanche photodiode, a second input coupled to receive the enable signal, and an output.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the implementation of an image sensor including a light source and a plurality of pixels, each with an avalanche photodiode, has not been described in detail, the described embodiments being compatible with conventional image sensors. More generally, the various applications where one or more avalanche photodiodes are provided for detecting photons have not been described in detail, the described embodiments being compatible with conventional applications of these photodiodes. Furthermore, the practical implementations of a photodiode adapted for use as an avalanche photodiode have not been described in detail, the described embodiments being compatible with the conventional implementations of a photodiode adapted for use as an avalanche photodiode.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following disclosure, a pixel, or an APD pixel, designates an avalanche photodiode pixel, for example a SPAD pixel.

In the following disclosure, a first state of the enable signal corresponds to a state, for example a high state, which is adapted to enable a pixel, while the second state of the enable signal corresponds to a state, for example a low state, which is adapted to disable the pixel. The first and second states for example correspond to different levels of voltage, for example respectively a first (high) voltage and a second (low) voltage, lower than the first voltage.

Figure 1:
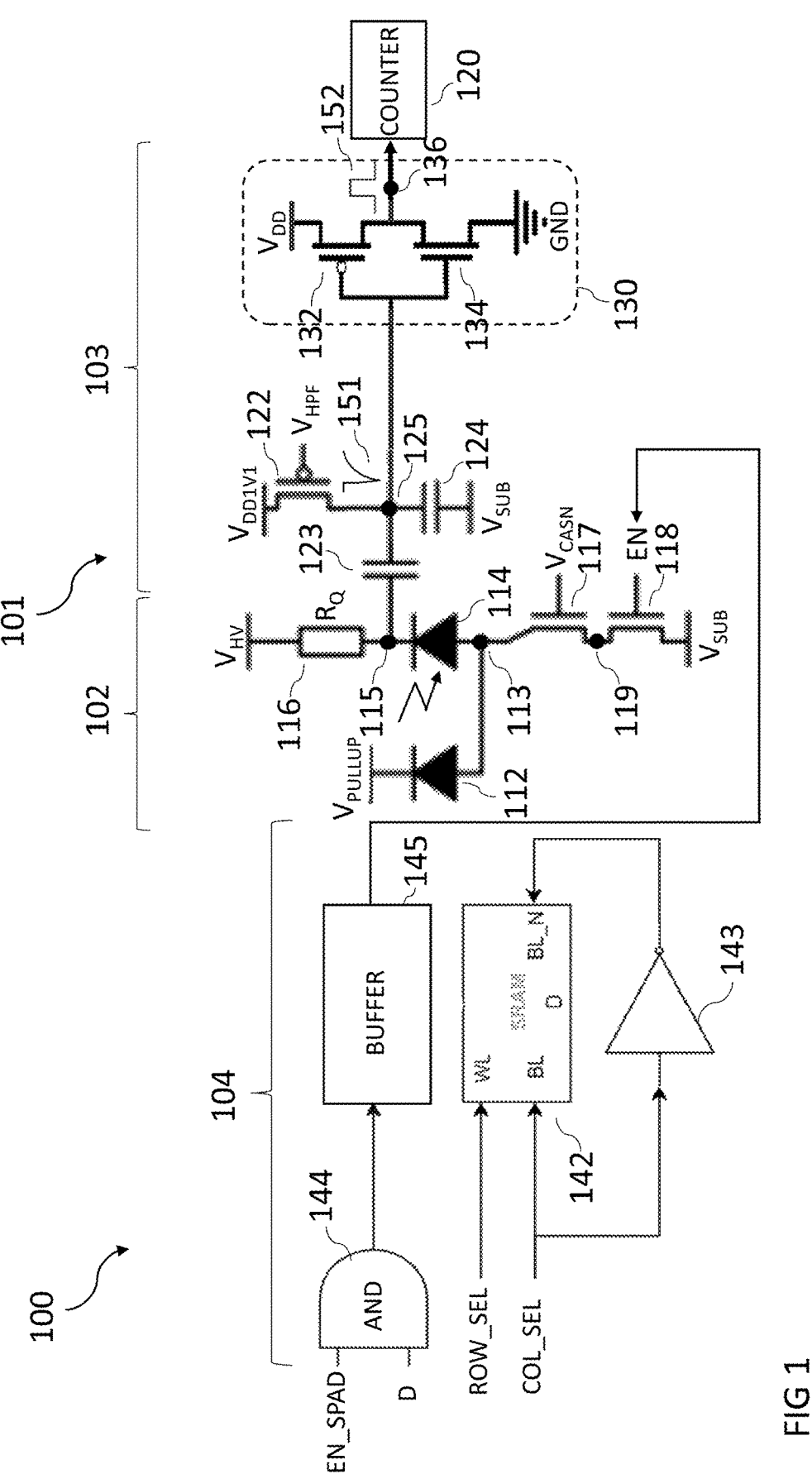
FIG. 1 represents an example of a portion of a SPAD matrix.

FIG. 1 represents an example of a portion of a SPAD matrix 100. SPAD matrix 100 includes a plurality of different sub areas of SPAD pixels, each sub area being coupled to a common counter 120, for example through an OR Tree (not illustrated). The SPAD pixels of the sub area may be enabled alternatively to have one single active SPAD pixel linked to the same counter at one time, while the other SPAD pixels of the sub area have preferably to be disabled. Only one SPAD pixel of a sub area is represented in FIG. 1.

More particularly, FIG. 1 shows an example of a SPAD circuit 102 and of a detection circuit 103 in a SPAD pixel 101, and a selection circuit 104 configured to selectively enabling a SPAD pixel, for example SPAD pixel 101, in a sub area of the SPAD matrix 100.

The SPAD circuit 102 includes, in the example of FIG. 1, a protection diode 112 and a SPAD photodiode 114. Protection diode 112 is a so-called "pull-up" diode, or a "clamp diode". Protection diode 112 is coupled, preferably connected, between a node of application of a pull-up voltage $(V_{PULLUP})$ and a first node 113. The anode of diode 112 is coupled, preferably connected, to first node 113 and the cathode of diode 112 is coupled, preferably connected, to the $V_{PULLUP}$ node.

Protection diode 112 is a disabling diode, allowing the anode node of the SPAD photodiode 114 to be held at an intermediate voltage value between a high voltage $(V_{HV})$ and a low voltage $(V_{SUB})$, for example equal to about 7V or 8V, when the SPAD photodiode 114 is turned OFF. For example, the pull-up voltage $V_{PULLUP}$ has a value at least 2V larger than the excess bias applied to the SPAD beyond the breakdown voltage.

The SPAD photodiode 114 is coupled, preferably connected, between first node 113 and a second node 115. The cathode of SPAD photodiode 114 is coupled, preferably connected, to second node 115 and the anode of SPAD photodiode 114 is coupled, preferably connected, to first node 113.

The SPAD circuit 102 further includes a quench resistance 116 ($R_Q$) coupled, preferably connected, between second node 115 and a node of application of a voltage ($V_{HV}$), for example a high voltage, for example a voltage greater than, or equal, to the diode breakdown voltage, which is typically between 10V and 40V.

The SPAD circuit 102 further includes an enable transistor 118 and a cascode-mounted transistor 117, the transistors 117, 118 being coupled, preferably connected, in series between a node of application of a low voltage ($V_{SUB}$), for example the ground, and first node 113. More particularly, cascode-mounted transistor 117 is coupled, preferably connected, by its conduction terminals, for example, drain and source, between first node 113 and a third node 119. Enable transistor 118 is coupled, preferably connected, by its conduction terminals, for example, drain and source, between third node 119 and the $V_{SUB}$ node.

The low voltage $V_{SUB}$ preferably corresponds to the voltage of the substrate on and in which the photodiode, and the associated circuits, are formed, and may be called "substrate voltage". The substrate may be coupled to the ground, and the low voltage may be substantially equal to 0V.

Transistors 117 and 118 are preferably MOS N-type field-effect transistors.

Cascode-mounted transistor 117 is biased by a voltage $V_{CASN}$, which is a fixed voltage and, preferably, has an intermediate value between high voltage $V_{HV}$ and low voltage $V_{SUB}$, while enable transistor 118 is biased by an enable signal EN, for example an enable voltage. Voltage $V_{CASN}$ is for example comprised between 1V and 2.5V.

When enable signal EN is in the first state, for example has a high voltage of around 1.1V, the enable transistor 118 turns ON, coupling the anode of the SPAD 114 to low voltage $V_{SUB}$, for example the ground, setting the reverse bias voltage of the SPAD 114 above the breakdown voltage, while the protection diode 112 disconnects the anode of the SPAD 114 from the pull-up voltage $V_{PULLUP}$. When an incoming photon strikes the SPAD 114, its cathode voltage decreases between the high voltage $V_{HV}$ and a lower voltage, creating a current pulse that is collected by the detection circuit 103. The avalanche may be quenched by the quench resistance 116, resetting the SPAD 114 for a next detection. When the enable/disable functionality is operating correctly, and the enable signal EN is in the second state, for example has a low voltage of around 0V, the enable transistor 118 is adapted to disconnect the anode of the SPAD 114 from low voltage $V_{SUB}$, the anode of the SPAD 114 being then coupled to the pull-up voltage $V_{PULLUP}$ and the SPAD 114 is deactivated.

The enable transistor 118 may form an enable/disable circuit, for example together with the cascode-mounted transistor 117.

The purpose for having a fixed voltage $V_{CASN}$ is to bias cascode-mounted transistor 117 so that it limits the current inrush to enable transistor 118 during the avalanche, protecting transistor 118 from damage.

The purpose for having an intermediate pull-up voltage $V_{PULLUP}$, may also be to protect enable transistor 118 when enable signal EN is in the second state, because, then, first node 113 is a floating node, that is, not connected to low voltage $V_{SUB}$.

The detection circuit 103 includes a high pass filter transistor 122 coupled, preferably connected, by its conduction terminals, for example, source and drain, between a node of application of a power supply voltage ($V_{DD1V1}$) and second node 115, for example though a fourth node 125 between the high pass filter transistor 122 and second node 115. A bias voltage node ($V_{HPF}$) is coupled, preferably connected, to the gate of transistor 122. Transistor 122 is preferably a P-type MOS field effect transistor. Voltage $V_{DD1V1}$ is for example between 0.9V and 1.3V. Voltage $V_{HPF}$ is for example between 0V and $V_{DD1V1}$.

The detection circuit 103 may further include capacitive elements, for example first and second capacitors 123, 124. The first capacitor 123 may be coupled, preferably connected, between second node 115 and fourth node 125, which may be called a "moving node". The second capacitor 124 may be coupled, preferably connected, between fourth node 125 and a node of application of low voltage $V_{SUB}$.

The detection circuit 103 also includes an inverter 130 coupled, preferably connected, between fourth node 125 and an output node 136 (output node of the inverter). The inverter 130 typically includes a P-type MOS field-effect transistor 132 in series with an N-type MOS field-effect transistor 134. The P-type transistor 132 is coupled, preferably connected, by its conduction terminals, for example, source and drain, between a node of application of a power supply voltage $V_{DD}$ and output node 136. The N-type transistor 134 is coupled, preferably connected, by its conduction terminals, for example, drain and source, between output node 136 and a node of application of a low voltage, for example ground GND. The gates of transistors 132, 134 are coupled, preferably connected, to fourth node 125.

When an avalanche occurs in photodiode SPAD 114, the voltage at fourth node 125 decreases, and high pass filter transistor 122 increases the voltage at node 125 after the avalanche, leading to a V-shaped voltage signal 151 (analogic signal), as illustrated at fourth node 125 in FIG. 1. The inverter 130 then converts the V-shaped voltage signal 151 into a pulse signal 152 (digital signal), as illustrated at output node 136 in FIG. 1. The pulse signal may then be applied to a counter 120 (COUNTER), preferably a digital counter, which is coupled to the output node 136 of the inverter. In FIG. 1, the output node 136 corresponds to an output node of the SPAD pixel 101 (pixel output node), and the pulse signal 152 forms a digital pixel output signal that can then be integrated by the counter 120.

Therefore, the SPAD pixel 101 feeds a counter 120.

The selection circuit 104 of the SPAD pixel 101 of the SPAD matrix 100 includes a register, or memory, 142 (SRAM) storing a binary value, or data D, associated with the SPAD pixel.

The register 142 receives a column selection signal COL_SEL from a SPAD column selection circuit (not illustrated in FIG. 1) and a row selection signal ROW_SEL from a SPAD row selection circuit (also not illustrated in FIG. 1). For example, the register 142 is configured to program the value D with the value of the column selection signal COL_SEL when the row selection signal ROW_SEL is asserted. According to the example of FIG. 1, the register 142 includes a word line input WL receiving the row selection signal ROW_SEL, a positive bit line input BL receiving the column selection signal COL_SEL, and a negative bit line input BL_N receiving the inverse of the column selection signal COL_SEL, generated by another inverter 143.

The selection circuit 104 for example includes an AND gate 144 (AND) dedicated to the SPAD pixel 101 of the matrix. The AND gate 144 provides an enable signal EN to the gate of the enable transistor 118. In some embodiments, the enable signal EN is amplified by a buffer 145 (BUF-FER), for example a buffer amplifier, coupled between the output of the AND gate 144 and the gate of the enable transistor 118. Thus, the enable signal EN may correspond to an output signal of the AND gate 144 or of the buffer 145. The AND gate 144 has one of its input nodes coupled to a corresponding output of the register 142 on which the data D is present, and the other of its input nodes coupled to an input line which receives a common activation signal EN_S-PAD for a sub area of SPAD matrix 100.

The counter 120 may be coupled in alternance with other SPAD pixels of a same sub area (not illustrated). When a SPAD pixel of a sub area is enabled (ON), the other SPAD pixels of the same sub area, are preferably disabled (OFF). For example, a SPAD pixel is ON when the enable signal EN applied to its enable transistor is in the first state, for example around 1.1V, and is OFF when the enable signal EN applied to its enable transistor is in the second state, for example around 0V. If the other SPAD pixels of the same sub area are not disabled, it can compromise the counting in the sub area of the matrix, which has pixels coupled to the same counter.

Unfortunately, the enable/disable functionality of a SPAD pixel may not correctly operating. For example, due to process defectivities, a deep trench isolation (DTI) which is dedicated to isolating a photodiode from other circuits such as an enable/disable circuit, could fail to reach the back surface of the substrate, making a resistive path. The enable/disable circuit, for example the enable transistor 118, could be shorted and the anode of the photodiode be permanently grounded, that is, the photodiode always enabled. In other words, such a process defectivity could compromise the capability to turn OFF the SPAD pixel. In that case, the affected SPAD pixel is continuously feeding the common counter, impacting a whole sub area of pixels.

According to a standard procedure, a damaged pixel may be initially identified, for example using a built-in checker, and then should be disabled, for example to avoid perturbing other pixels coupled to the same counter. This standard procedure however does not work for a pixel whose enable/disable functionality is damaged.

The inventors provide an avalanche photodiode pixel capable of addressing the previously-described improvement needs, and to overcome all or part of the disadvantages of the previously-described SPAD pixels. In particular, the inventors provide a solution to make avalanche photodiode pixels more robust against process defectivity, preferably without complex additional circuit or device.

Embodiments of SPAD pixels will be described hereafter. The described embodiments are non-limiting and various variants will occur to those skilled in the art based on the indications of the present disclosure. SPAD pixels are described, but the embodiments also apply to other avalanche photodiode pixels.

Figure 2:
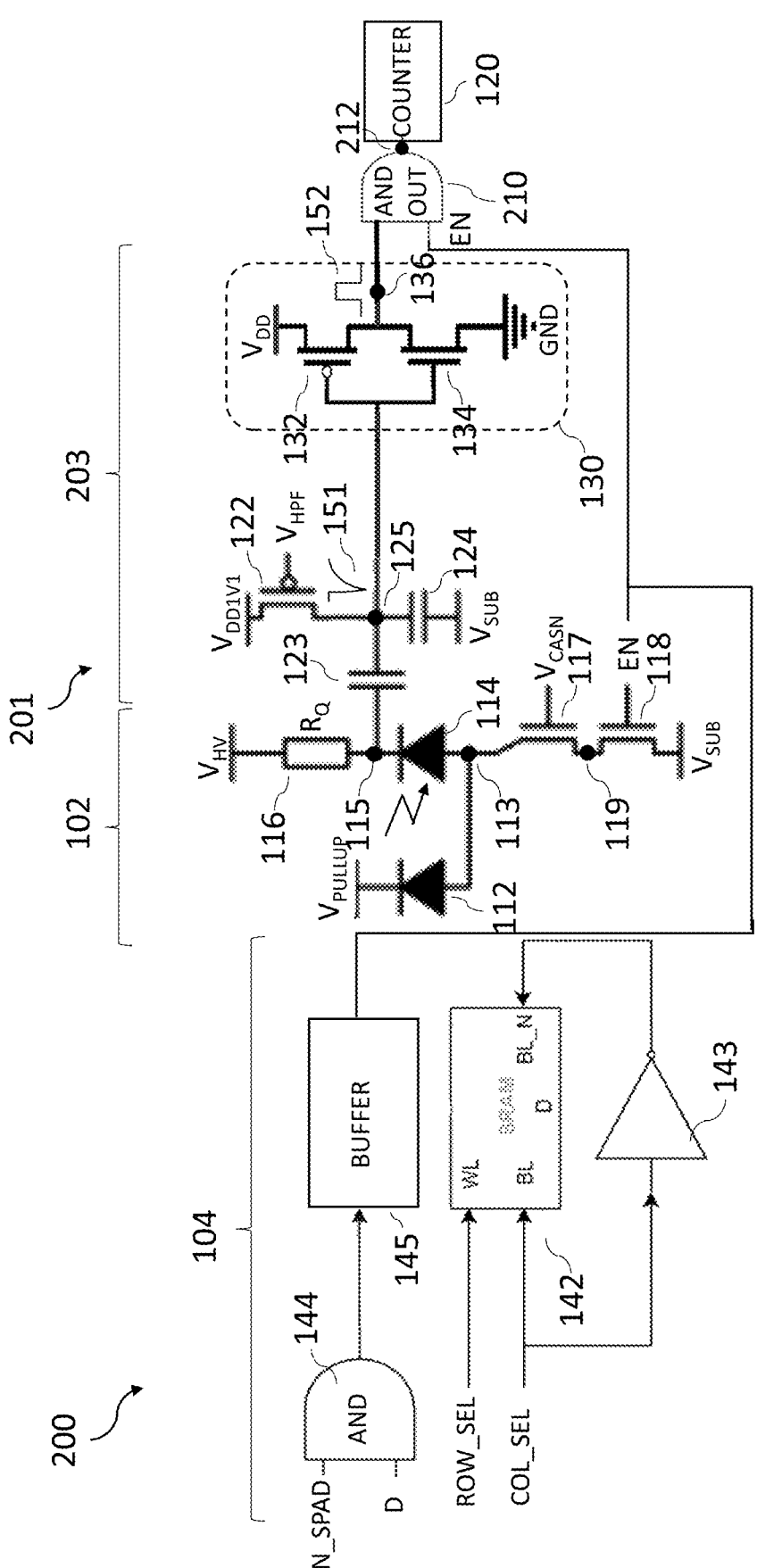
FIG. 2 represents a portion of a SPAD matrix including a SPAD pixel according to an embodiment.

FIG. 2 represents a portion of a SPAD matrix 200 including a SPAD pixel 201 according to an embodiment. Similarly, to SPAD matrix 100 of FIG. 1, SPAD matrix 200 includes a plurality of different sub areas of SPAD pixels, each sub area being coupled to a common counter 120, for example through an OR Tree (not illustrated).

FIG. 2 shows a SPAD pixel 201 including a SPAD circuit 102 similar to that of FIG. 1, and a detection circuit 203. FIG. 2 also shows a selection circuit 104 of SPAD matrix 200 similar to the selection circuit of FIG. 1.

The detection circuit 203 of FIG. 2 differs from that of FIG. 1 mainly in that it includes an output AND gate 210 (AND OUT). The output AND gate 210 includes a first input node coupled, preferably connected, to the output node 136 of the inverter 130, and a second input node coupled, for example connected, to an output of the buffer 145, or of the AND gate 144, in order to receive the enable signal EN. In other words, the enable signal EN is applied to the enable transistor 118 and to the output AND gate 210. The output AND gate 210 has its output node coupled, preferably connected, to the counter 120.

Therefore, even if the enable/disable functionality is damaged, for example if the enable transistor 118 is shorted, and the anode of the photodiode SPAD 114 is permanently grounded, that is, the photodiode always enabled, the enable signal EN is still sent to the output AND gate 210. The AND function applied by the output AND gate 210 between the pulse signal 152 generated by the inverter 130 and the enable signal EN generates, at a pixel output node 212, a digital pixel output signal which is applied to the counter 120. The output AND gate 210 is configured to block, or cancel, the pulse signal 152 when the enable signal EN is in the second state. In other words, when the enable signal EN is in the second state, the output AND gate 210 blocks any signal which otherwise would have been integrated by the counter 120. The output AND gate 210 is configured to let the pulse signal 152 pass when the enable signal EN is in the first state. When the enable signal EN is in the first state, then the pulse signal 152 generated by the inverter 130 can be integrated by the counter 120.

This first solution is efficient to disable a SPAD pixel even when the enable/disable functionality of this SPAD pixel is damaged. In addition, the first solution allows fast SPAD pixel shut-off, or disabling, as the shut-off is directly done at the pixel output node 212.

The first solution calls for adding a component (another AND gate), which may consume area.

Figure 3:
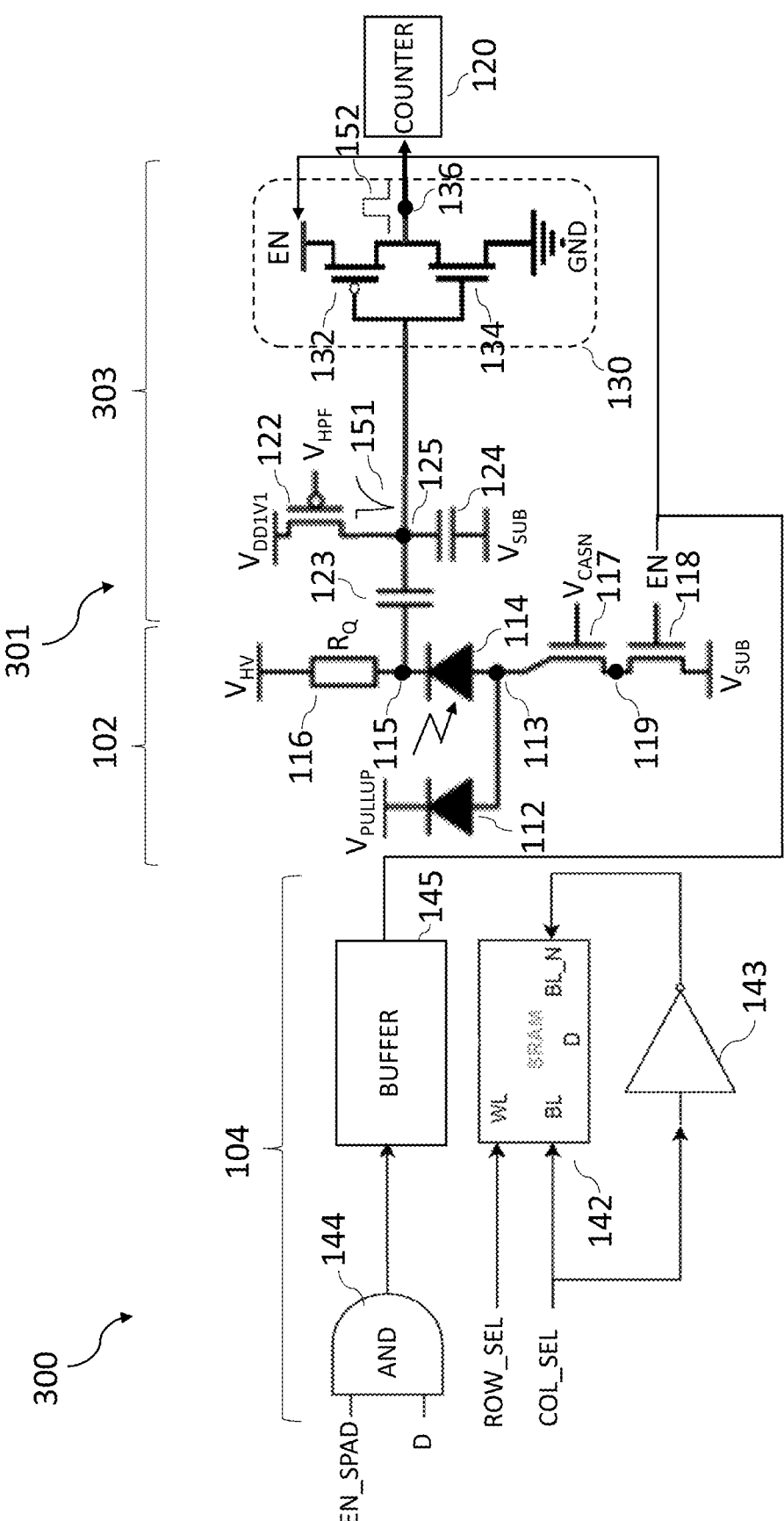
FIG. 3 represents a portion of a SPAD matrix including a SPAD pixel according to another embodiment.

FIG. 3 represents a portion of a SPAD matrix 300 including a SPAD pixel 301 according to another embodiment. Similarly, to SPAD matrix 100 of FIG. 1, SPAD matrix 300 includes a plurality of different sub areas of SPAD pixels, each sub area being coupled to a common counter 120, for example through an OR Tree (not illustrated).

FIG. 3 shows a SPAD pixel 301 including a SPAD circuit 102 similar to that of FIG. 1, and a detection circuit 303. FIG. 3 also shows a selection circuit 104 of SPAD matrix 300 similar to the selection circuit of FIG. 1.

The detection circuit 303 of FIG. 3 differs from that of FIG. 1 mainly in that the inverter 130 is not powered by the power supply voltage $V_{DD}$ anymore, but is powered (controlled) by the enable signal EN. In the illustrated example, the node of application of a power supply voltage to the P-type transistor 132 is coupled, preferably connected, to an output of the buffer 145, or of the AND gate 144 directly, in order to receive the enable signal EN. Similarly to FIG. 1, in the embodiment of FIG. 3, the pixel output node corresponds to the output node 136 of the inverter 130.

Therefore, even if the enable/disable functionality is damaged, for example if the enable transistor 118 is shorted, and the anode of the photodiode is permanently grounded, that is, the photodiode always enabled, the enable signal EN is still sent to the inverter 130. When the enable signal EN is in the second state, then the inverter 130 does not generate a pulse signal at the output node 136 of the inverter, that is, no digital pixel output signal at the pixel output node, which otherwise would have been integrated by the counter 120. In other words, the enable signal EN can prevent a pulse signal to be generated and integrated by the counter 120. When the enable signal EN is in the first state, then the inverter 130 is powered and can thus generate a pulse signal 152 at the output node 136 of the inverter, that is, a digital pixel output signal at the pixel output node 136, which can be integrated by the counter 120.

This second solution is efficient to disable a pixel even when the enable/disable functionality of this pixel is damaged, and, in addition, may not call for another component. Thus, the second solution is more is more optimal in terms of surface used. In addition, the second solution may decrease energy consumption, since the inverter of the pixel may be activated only, or mainly, when the pixel is ON, that is, only, or mainly, during the integration time of the pixel.

The inventors have demonstrated, using simulations, that even in worst cases, using the output signal EN of the buffer 145 or of the AND gate 144 as a supply for the inverter 130 does not affect significantly the states of the buffer or AND gate. Using simulation, the inventors have found only 152 mV drop on the output signal of the buffer or the AND gate, which does not change the state of any logic circuit connected to the output of the buffer or AND gate. Furthermore, the inventors have demonstrated that the switch speed of the inverter 130 is practically unaffected when using enable signal EN.

The buffer 145 can be provided in order to increase the power of the enable signal EN, particularly when the pixel is ON. For example, the buffer includes two inverters in series with each other, the inverters having for example larger transistors than those of the AND gate 144.

In a variant, which can be applied to the first or the second solution, the detection circuit of the SPAD pixel can include a second inverter (not illustrated) between the inverter 130 and the counter 120, for example between the inverter 130 and the output AND gate 210. The second inverter can be designed to be bigger and/or stronger, like a buffer stage more capable of driving fast long buses or lines connecting the counter.

The inventors have shown that the first or second solution does not impact the rising time of the digital pixel output signal.

Thus, the first or second solution allow having more robust SPAD pixels robust against process defectivity, without degrading other characteristics of these SPAD pixels.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

An avalanche photodiode pixel (201; 301) may be summarized as including: a transistor (118) adapted to be controlled by an enable signal (EN) having a first state for controlling the enabling of the pixel and a second state for controlling the disabling of the pixel, the transistor being configured to couple an avalanche photodiode (114) of the pixel to a node of application of a substrate voltage ($V_{SUB}$) when the enable signal is in the first state; and an output circuit (210, 130) adapted to be controlled by the enable signal and configured to provide a pixel output signal (152) when the enable signal is in the first state and to block the pixel output signal when the enable signal is in the second state.

The enable signal (EN) may be an enable voltage.

The avalanche photodiode pixel (201; 301) may further include a detection circuit (203; 303) coupled to the avalanche photodiode (114) and configured to generate the pixel output signal (152).

The detection circuit (203; 303) may include an inverter (130), for example configured to convert an analogic signal (151) generated by the avalanche photodiode (114) into a digital signal to generate the pixel output signal (152).

The output circuit may include an output AND gate (210) including a first input node to which the pixel output signal (152) is adapted to be applied, a second input node to which the enable signal (EN) is adapted to be applied, the output node of the output AND gate being coupled, or corresponding, to an output node (212) of the pixel.

The first input node of the output AND gate (210) may be coupled, for example connected, to an output node (136) of the inverter (130).

The inverter (130) may be adapted to be powered by a dedicated power supply voltage ($V_{DD}$).

The output circuit may include the inverter (130), the inverter being adapted to be controlled by the enable signal (EN), for example the enable signal being applied to a node of application of a power supply voltage of the inverter.

An output node (136) of the inverter may be coupled, or corresponds, to an output node of the pixel.

The output circuit (210, 130) may be coupled, for example connected, to a counter (120), for example the counter being configured to integrate the pixel output signal (152) when the enable signal (EN) is in the first state.

The avalanche photodiode pixel may further include another inverter between the inverter (130) and the output node of the detection circuit.

The avalanche photodiode pixel (201; 301) may further include a buffer (145) adapted to increase the power of the enable signal (EN).

A pixel matrix (200; 300) may be summarized as including a plurality of avalanche photodiode pixels (201; 301), wherein the avalanche photodiode pixels are organized into different sub areas of avalanche photodiode pixels, the avalanche photodiode pixels of the same sub area being coupled to a common counter (120).

The pixel matrix (200; 300) may further include a selection circuit (104) configured to selectively addressing the enable signal (EN) to one avalanche photodiode pixel (201; 301) of the avalanche photodiode pixels of a sub area, the selection circuit including an output node coupled at least to the transistor (118) of the avalanche photodiode pixel.

The output node of the selection circuit (104) may be also coupled or connected to the second input node of the output AND gate (210).

The output node of the selection circuit (104) may be also coupled or connected to a node of application of a power supply of the inverter (130).

The buffer (145) may be included in the selection circuit (104).

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
 a first pixel including:
  an avalanche photodiode;
  a detection circuit coupled to the avalanche photodiode, the detection circuit including a first inverter;
  a transistor configured to be controlled by an enable signal having a first state for enabling the first pixel and a second state for disabling the first pixel, the transistor being configured to couple the avalanche photodiode to a node configured to apply a substrate voltage when the enable signal is in the first state; and an output circuit configured to be controlled by the enable signal and configured to provide a pixel output signal when the enable signal is in the first state and to block the pixel output signal when the enable signal is in the second state, the output circuit including an output AND gate including a first input node that is coupled to an output node of the first inverter.

2. The device according to claim 1, wherein the enable signal is an enable voltage.

3. The device according to claim 1, wherein the detection circuit is configured to generate the pixel output signal.

4. The device according to claim 3, wherein the first inverter is configured to convert an analog signal generated by the avalanche photodiode into a digital signal to generate the pixel output signal.

5. The device according to claim 1, wherein the output AND gate in the output circuit includes a second input node configured to receive the enable signal, and an output node coupled to an output node of the first pixel.

6. The device according to claim 5, wherein the first input node of the output AND gate is configured to receive the pixel output signal.

7. The device according to claim 6, wherein the first inverter is powered by a dedicated power supply voltage.

8. The device according to claim 4, wherein the output circuit includes the first inverter, the first inverter being configured to be controlled by the enable signal applied to a power supply node of the first inverter.

9. The device according to claim 8, wherein the output node of the first inverter is coupled to an output node of the first pixel.

10. The device according to claim 1, wherein the output circuit is coupled to a counter configured to integrate the pixel output signal when the enable signal is in the first state.

11. The device according to claim 4, further comprising a second inverter between the first inverter and an output node of the detection circuit.

12. The device according to claim 1, further comprising a buffer configured to increase a power of the enable signal.

13. The device of claim 1, comprising a pixel matrix including a plurality of pixels substantially identical to the first pixel, wherein the pixel matrix includes the first pixel, wherein the pixels are organized into a plurality of sub areas each including a respective group of pixels coupled to a common counter.

14. The device according to claim 13, further comprising a selection circuit configured to selectively address the enable signal to a selected pixel of the pixels of a sub area, the selection circuit including an output node coupled at least to the transistor of the selected pixel.

15. The device according to claim 14, wherein the first input node of the output AND gate is configured to receive the pixel output signal, the output AND gate including a second input node configured to receive the enable signal, and an output node coupled to an output node of the pixel, wherein the output node of the selection circuit is also coupled to the second input node of the output AND gate.

16. The device according to claim 14, wherein each detection circuit is configured to generate the pixel output signal, the first inverter of the detection circuit configured to convert an analogic signal generated by the avalanche photodiode into a digital signal to generate the pixel output signal, wherein the output circuit includes the inverter, the inverter being configured to be controlled by the enable signal applied to a power supply node of the inverter, wherein the output node of the selection circuit is also coupled to the power supply node of the inverter.

17. The device according to 14, wherein each pixel includes a buffer configured to increase a power of the enable signal, wherein the buffer is included in the selection circuit.

18. A method, comprising:

applying a substrate voltage to an avalanche photodiode of a pixel by enabling, with a first state of an enable signal, a transistor of the pixel;

disabling, with a second state of the enable signal, the transistor;

controlling an output circuit of the pixel with the enable signal;

generating a pixel output signal with a detection circuit of the pixel, the detection circuit including a first inverter and a second inverter coupled between the first inverter an output node of the detection circuit;

providing, with the output circuit, the pixel output signal when the enable signal is in the first state; and blocking the pixel output signal when the enable signal is in the second state.

19. The method of claim 18, wherein the detection circuit is coupled to the avalanche photodiode.

20. The method of claim 18, comprising:

receiving, with a first input node of an AND gate of the output circuit, the pixel output signal;

receiving, with a second input node of the AND gate, the enable signal; and providing the pixel output signal with an output node of the AND gate.

21. A device, comprising:

a selection circuit configured to output an enable signal;

a pixel coupled to the selection circuit and including:

an avalanche photodiode;

a detection circuit coupled to the avalanche photodiode, the detection circuit including a first inverter;

a transistor coupled between the avalanche photodiode and a substrate voltage and having a gate terminal configured to receive the enable signal;

an output circuit having a first input coupled to the avalanche photodiode, a second input coupled to receive the enable signal, and an output, the output circuit including an output AND gate including a first input node that is coupled to an output node of the first inverter.

22. The device of claim 21, wherein the output circuit includes a high supply terminal corresponding to the second input of the output circuit, and an output correspond to the output of the output circuit.

23. The device of claim 21, wherein the AND gate in the output circuit includes a second input node configured to receive the enable signal.

* * * * *